United States Patent [19]

Jorgensen et al.

[11] Patent Number: 4,721,017
[45] Date of Patent: Jan. 26, 1988

[54] INDEXING TABLE

[75] Inventors: Arne R. Jorgensen, Lombard; Dennis E. Tiberius, Naperville, both of Ill.

[73] Assignee: Snow Manufacturing Company, Bellwood, Ill.

[21] Appl. No.: 885,542

[22] Filed: Jul. 14, 1986

[51] Int. Cl.$^4$ .................... B23B 29/24; B23Q 17/24
[52] U.S. Cl. .................... 74/813 L; 82/36 A;
29/48.5 R; 74/813 R; 74/816; 91/44; 263/70; 408/35
[58] Field of Search ............. 74/813 R, 813 C, 813 L, 74/814-822; 82/36 A; 29/48.5 R, 48.5 A; 91/44; 269/70; 408/35

[56] References Cited

U.S. PATENT DOCUMENTS

| | | | |
|---|---|---|---|
| 3,166,954 | 1/1965 | Fowler et al. | 74/822 |
| 3,195,373 | 7/1965 | Fisher | 74/822 |
| 3,241,656 | 3/1966 | Thornton | 74/822 |
| 3,440,905 | 8/1969 | Tomiyama | 74/822 |
| 3,581,602 | 6/1971 | Bachmann | 74/822 |
| 4,006,651 | 2/1977 | Anderson et al. | 74/813 R |
| 4,028,966 | 6/1977 | Taylor | 74/813 L |
| 4,109,552 | 8/1978 | Imoberdorf | 74/813 L |
| 4,524,655 | 6/1985 | Waldron et al. | 74/813 L |
| 4,574,660 | 3/1986 | Kaminsky et al. | 74/813 L |

Primary Examiner—Gary L. Smith
Assistant Examiner—Vinh Luong
Attorney, Agent, or Firm—Mason, Kolehmainen, Rathburn & Wyss

[57] ABSTRACT

A new and improved indexing table for supporting a workpiece on a machine tool and the like includes a base with a workpiece supporting table carried on a support shaft journaled for rotation to index the workpiece for machine tool operations. A drive system is provided for rotating the table in one direction about a longitudinal axis of the support shaft and an indexing wheel is provided on the shaft having a plurality of index slots spaced angularly around the periphery for securing the table in selected indexing positions. A shot pin is provided for engaging selected slots in the wheel to lock the table in a fixed position and when the shot pin is retracted, the table is then permitted to rotate toward a next indexing position. Removable stops are insertable into the index wheel at selected positions corresponding to index slots therein and the stops in combination with a stop system are effective to arrest rotation of the workpiece and supporting table as the table is rotationally indexed toward and reaches a next selected index position.

12 Claims, 7 Drawing Figures

INDEXING TABLE

BACKGROUND OF THE INVENTION

1. Field of the Invention

The present invention relates to indexing tables and more particularly to a workpiece supporting index table for sequentially positioning a workpiece carried thereon into desired indexing positions ready for successive machine tool operations to be performed on the workpiece. Moreover, the indexing table in accordance with the present invention is adapted to provide successive, precision angular indexing operations for supporting and holding a workpiece during successive machine tool or other operations performed thereon.

2. Description of the Prior Art

Over the years, indexing tables for machine tools have been developed and producing manufacturers of indexing devices have continually strived to increase the precision of these tables so that the finished workpieces made thereon may be maintained at a high level of quality with large numbers being produced at high rates of speed. A pneumatically operated rotating index table has been developed by the Vigel Machine Company of Turin, Italy and the Jackson Company of the United States has developed an indexing table with harmonic indexing motion.

Snow Manufacturing Company of Bellwood, Illinois, assignee of the present application has developed precision rotary turrets and index tables adapted for drilling, tapping, chucking, and boring operations with machine tools. The following U.S. patents have been directed towards various work holders and precision rotary turrets and indexing tables: U.S. Pat. No. 2,288,023 Ortegren, et al.; U.S. Pat. No. 2,618,982 Mead; U.S. Pat. No. 2,871,732 Olson; U.S. Pat. No. 2,874,599 Charlat; U.S. Pat. No. 3,267,772 Burg U.S. Pat. No. 3,267,772 Gardner; U.S. Pat. No. 4,380,939 and U.S. Pat. No. 4,550,631 Yamazaki, et al.

OBJECTS OF THE PRESENT INVENTION

It is an object of the present invention to provide a new and improved precision rotary turret or index table for use with standard machines for drilling, tapping, chucking and boring, etc.

Another object of the present invention is to provide a new and improved rotary index table which is strong and well suited for a firm and secure positioning and holding of a workpiece in a selected indexing position with no backlash.

Another object of the present invention is to provide a new and improved index table of the character described which is relatively low in cost and yet easily adaptable to acommodate a sequence of accurate indexing rotational movements having different amounts of angular rotation between successive indexing positions.

Another object of the present invention is to provide a new and improved rotary index table of the character described wherein the amount of angular rotation between successive index positions can be selected over a wide range of angular increments.

Yet another object of the present invention is to provide a new and improved rotary index table of the character described which is capable of providing extremely fast and repeatable index positions.

Still another object of the present invention is to provide a new and improved precision rotary index table which is substantially unaffected by wear as the number of repetitive cycles of operation increases.

More particularly, it is an object of the present invention to provide a precision rotary index table of the character described which is extremely accurate in positioning a workpiece and which is capable of providing repeat accuracy within + or −0.001″.

BRIEF SUMMARY OF THE INVENTION

The foregoing and other objects and advantages of the present invention are accomplished in a new and improved rotary index table having a base and a workpiece supporting table journaled on a support shaft for relative rotation on the base. A drive system is provided for rotating the table in one direction about the longitudinal axis of the support shaft and an index wheel is mounted on the shaft having a plurality of angularly spaced apart index slots cooperable with a wedge shaped shot pin which is moveable into a lock position engaging a selected slot in the wheel for holding the table firmly in a precision indexed position. The shot pin is subsequently retractable for permitting successive indexing rotation of the table. A stop system is provided for arresting the rotational movement of the table adjacent a selected stopping or indexing position. As the wheel approaches a desired indexing slot, the shot pin is advanced into locking engagement with the particular slot to precisely align and center the table on a radial and thereafter hold the table in position while work is performed on the workpiece carried thereby. A sequence of successive indexing rotational movements of the table may be easily programmed and different angular inrements between indexed positions may be obtained by selecting only particular positions for the detachable insertion of stops on the index wheel.

BRIEF DESCRIPTION OF THE DRAWING

For a better understanding of the present invention, reference should be had to the following detailed description taken in conjuntion with the drawings, in which.

BRIEF DESCRIPTION OF A PREFERRED EMBODIMENT OF THE INVENTION

Referring now more particularly to the drawings, therein is illustrated a new and improved indexing table for supporting a workpiece for rotary indexing movement for drilling, tapping, chucking and boring operations in a standard machine tool such as a drilling and tapping machine, etc. The indexing table of the present invention is referred to generally by the reference numeral 10 and is especially adapted for supporting a workpiece 12 in position for precision rotary indexing so that operations of drilling, tapping, chucking, boring, etc., can be performed on a standard machine tool on which the indexing table is installed.

The indexing table 10 includes a base 14 adapted to be removably mounted on a bed or way of a machine tool, and the base includes a relatively large, generally rectangular shaped lower portion 16 (FIG. 1) having a pair of upstanding, longitudinally spaced apart, parallel opposite side walls 18 (FIG. 2) integrally joined together at one end by an end plate or mounting wall 20 having a pair of opposite, upstanding mounting lugs 22 having drilled openings 23 therein for facilitating the attachment of the indexing table onto the bed of a machine tool with bolts or the like.

Figure 1:
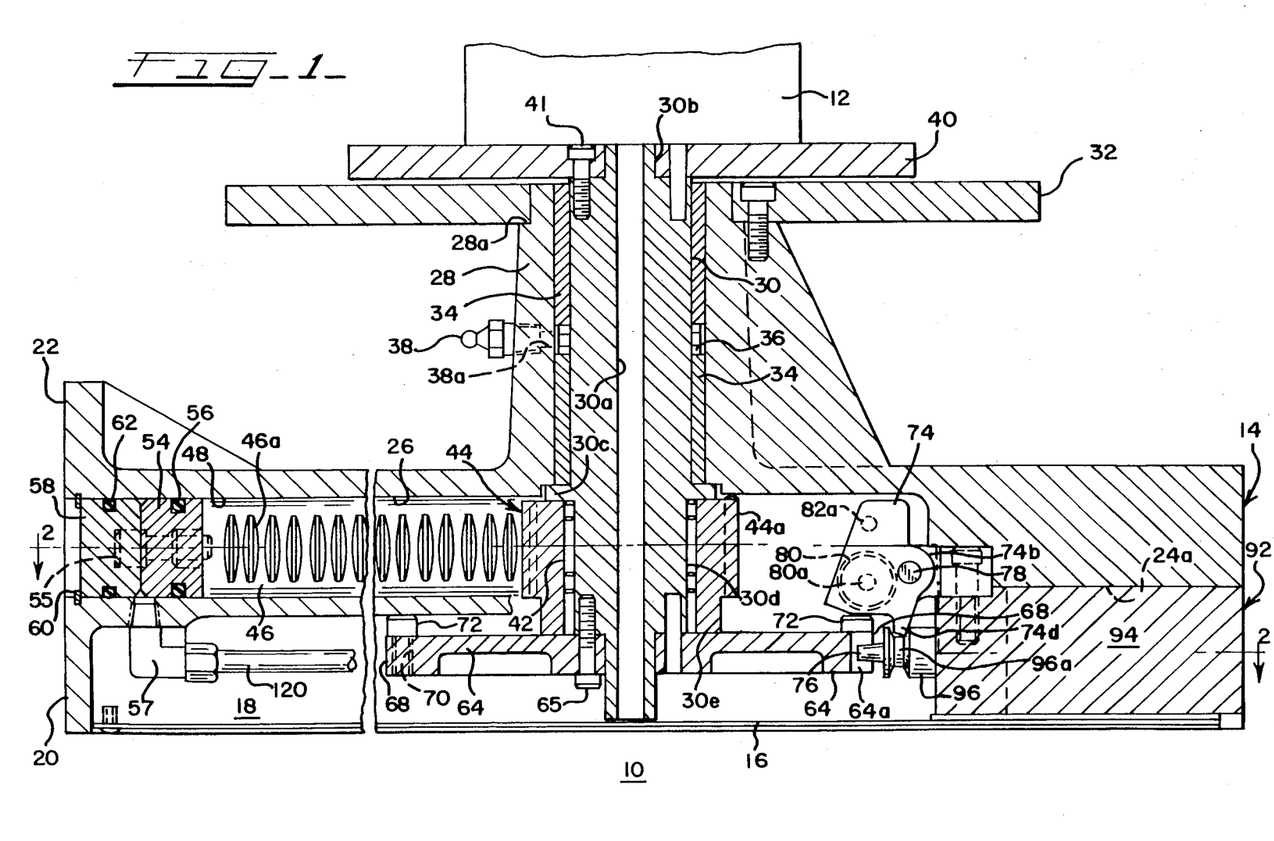
FIG. 1 is a cross-sectional elevational view of a new and improved index table constructed in accordance with the features of the present invention.
Figure 2:
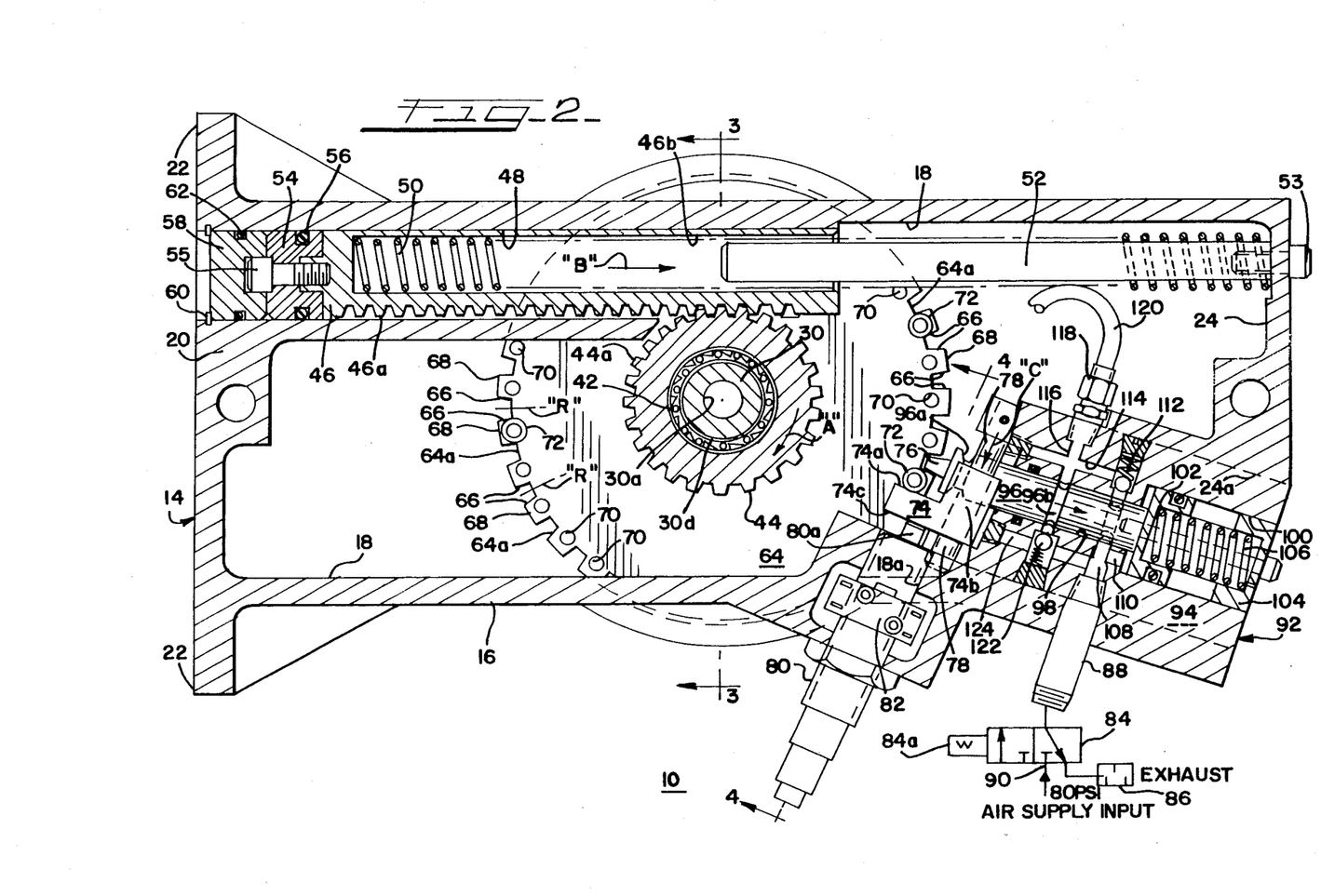
FIG. 2 is a cross-sectional view taken substantially along lines 2—2 of FIG. 1.

The lower portion of the base 14 also includes an integral end wall 24 directly opposite the wall 20 and the end wall is provided with a large rectangular opening or slot 24a which extends angularly inwardly into the hollow interior of the base as best shown in FIG. 2. The slot is positioned adjacent the junction or corner of the end wall 24 and the adjacent side wall 18. The parallel side walls 18 and the opposite end walls 20 and 24 are integrally joined to an intermediate level top wall 26 having an integral, hollow shaft housing 28 projecting upwardly from a central portion thereof. The shaft housing is designed for supporting a hollow, upstanding table support shaft 30 having a coaxial central bore 30a extending between opposite ends. At the upper end, the shaft housing is formed with an annular outer shoulder or recess 28a on which is mounted a radially outwardly extending circular plate 32. The shaft 30 is supported within the internal bore of the shaft housing 28 for rotation about a longitudinal axis and for this purpose, a pair of sleeve bearings 34 are mounted in the bore around the shaft and spaced above and below an annular segment 36 forming a grease channel for supplying lubrication to the shaft. The annular segment 36 is supplied with grease or other lubricant through a grease fitting 38 in communication with the channel through a radial passage 38a as shown in FIG. 1.

At the upper outer end, the table support shaft or spindle 30 is provided with an annular recess or shoulder 30b on which is seated a circular table 40 for supporting the workpiece 12 mounted in place for rotational indexing operations. The table 40 is secured to the upper end portion of the hollow support shaft 30 with a plurality of cap screws 41 so that the table and any workpiece 12 secured thereto always rotates with the shaft 30 as the shaft is rotationally indexed in a clockwise direction (as shown by the arrow A in FIG. 2) between successive angular indexing positions.

The support shaft is provided with a radial flange 30c intermediate the ends, spaced between a lower sleeve bearing 34 and a reduced diameter, shaft segment 30d formed below the flange. A one-way roller clutch assembly 42 is mounted on the shaft section 30d below the radial flange 30c and a drive gear 44 is mounted on the roller clutch assembly so that when radial teeth 44a of the gear are drivingly engaged by teeth 46a of a reciprocally movable rack piston 46, the shaft will be rotated in a clockwise direction as the rack piston 46 moves on an advancing stroke as indicated by the arrow B (FIG. 2), but because of the one-way clutch 42, the gear 44 and shaft 30 will not rotate in a counter-clockwise direction as the rack piston 46 moves on a return stroke in an opposite direction. It will thus be seen that as the rack piston 46 moves on successive advance and return strokes, the support shaft 30 and the table 40 carrying the workpiece 12 will be rotated in incremental rotative indexing steps in a clockwise direction only (as viewed in FIG. 2) and that rotation in an opposite or counter-clockwise direction will not take place to any substantial extent.

Figure 3:
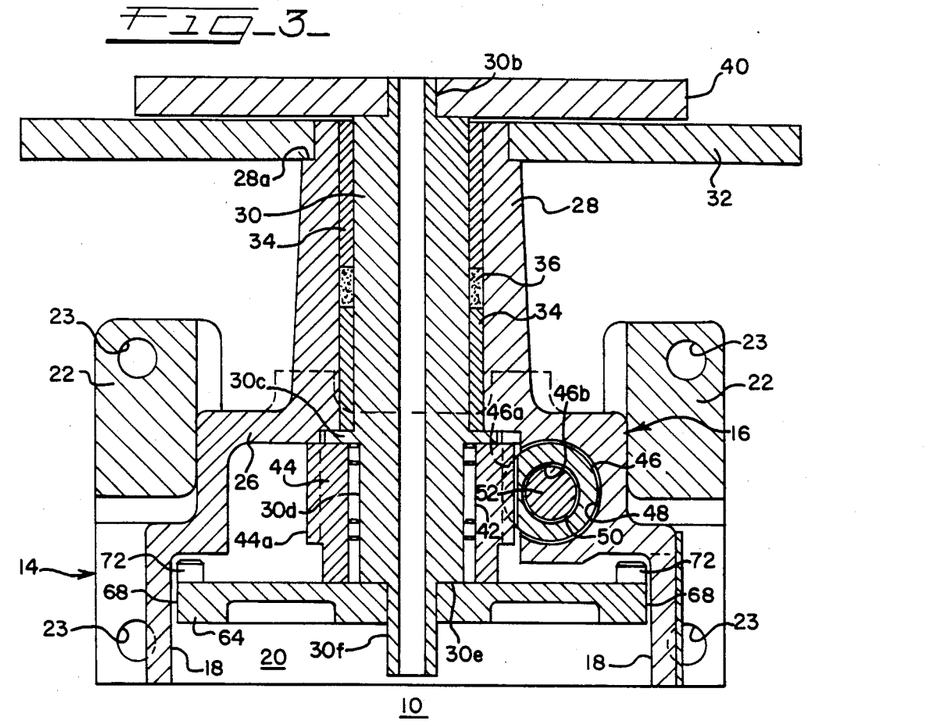
FIG. 3 is a transverse cross-sectional elevational view taken substantially along lines 3—3 of FIG. 2.

In accordance with the present invention, the rack piston 46 is mounted for longitudinal reciprocation in a cylinder bore 48 integrally formed in the base 14 extending along one of the side walls 18 and the top wall 26 as shown in FIGS. 1, 2 and 3. The rack piston 46 is biased towards a rest position as shown in FIG. 2 by a coil spring 50 which extends into a coaxially aligned hollow bore segment 46b formed in the outer end portion of the rack piston. The coil spring is supported on an elongated spring guide 52 secured to the end wall 24 by a cap screw 53.

At the inner end, the rack piston 46 is provided with a piston segment 54 of annular configuration having an external groove in which an O-ring 56 is seated to provide a tight pneumatic seal against the surface of the rack piston cylinder wall 48. The piston segment is secured to the rack piston body by a cap screw 55 and the corner of the piston segment 54 is chamfered as shown to define a small annular pressure chamber of triangular radial cross-section when the piston is retracted as shown. The cylinder 48 is in communication with an elbow fitting 57 provided for supplying pressurized air to actuate and move the piston 46 outwardly on an advancing stroke as shown by the arrow B to rotatably index the table 40 in a clockwise direction.

As viewed in FIG. 2, the lefthand end of the rack piston cylinder 48 is closed by an end plug 58 held in place by a C-ring 60 and the plug has an external groove intermediate opposite end faces thereof for accommodating a sealing O-ring 62. When a shot of pressurized air is supplied to the rack piston cylinder 48 via the elbow fitting 57, the fluid moves between the opposed end faces of the end plug 58 and the piston segment 54 and the rack piston 46 is forced outwardly on an advancing, wheel indexing stroke. The teeth 46a engage the teeth 44a on the gear 44 to turn the support shaft 30 through the one-way clutch 42. As this occurs, the coil spring 50 is compressed on the spring guide 52 and when pressurized fluid is subsequently exhausted from the rack piston cylinder 48, the spring is effective to return the rack piston 46 back to the rest position as shown in a direction opposite the arrow B, thus expelling any fluid remaining within the cylinder between the piston segment 54 and end plug 58. Reverse rotation of the gear 44 in a counter-clockwise direction does not rotate the shaft 30 in a reverse direction because of the one-way roller clutch 42 interposed therebetween.

In accordance with the present invention, at the lower end portion, the table support shaft 30 is provided with an annular shoulder 30e forming a hollow shaft section 30f of reduced diameter on which is mounted a circular, index wheel 64 secured in place to the shaft by a plurality of cap screws 65. The index wheel 64 includes a generally flat or planar upper face and a circular outer periphery which is formed with a plurality of radial, angularly spacedapart, wedge-shaped index grooves or slots 64a, each having an open outer end on the circular periphery of the index wheel. Each index slot includes a pair of opposite, divergent side walls 66 spaced equidistant on opposite sides of a central radial "R" (FIG. 2) extending through the central axis of the wheel and the axis of rotation of the shaft 30. The divergent opposite sides 66 of each slot 64a provide guide surfaces for precision centering of the index wheel 64 with respect to the radial center line R of the slot. The radial lines R are equilaterally spaced around and radiate from the center of the index wheel.

Between each of the circumferentially spaced-apart indexing slots 64a there is provided a land portion 68 (FIG. 2) having an arcuate outer edge conforming to the circumference of the index wheel as best shown in FIG. 2. Each land between a pair of adjacent index slots 64a is formed with a centrally positioned threaded bore 70 adapted to receive a threaded, depending shank of a cap screw 72 inserted therein so as to position a relatively large, cylindrical head of the cap screw as a indexing stop rising above the planar upper face of the index wheel. Cap screws 72 may be installed in each of the equilaterally spaced apertures 70 to provide a maximum number of indexing stops for the wheel for a single revolution thereof, however, the cap screws can also be inserted into particularly selected threaded bores 70 in order to provide for precision angular indexing strokes of the table 40 in one or multiples of an angular minimum amount of wheel rotation determined by the total number of slots on the wheel.

For an example, if the index wheel 64 contains a total of 40 slots 64a spaced equilaterally around the peripheral edge, the interval between adjacent slots represents an angular separation of 9° for a total of 360° for each complete revolution of the index wheel. Each slot or groove 64a has an associated bore 70 so that a cap screw 72 inserted in that bore will provide a wheel stopping action for the particular slot. This arrangement provides a minimum of 9° angular spacing between adjacent indexing positions and indexing rotation in even multiples of 9° can be achieved by selectively positioning stop screws 72 in particular bores in a desired spacing sequence around the wheel. It is thus possible for the index wheel 64 of the index table 10 to be programmed for successive indexing strokes of different angular values between successive stops as determined by the positioning the cap screws 72 in particular bores 70 on the wheel. With the index table 10 it is not necessary that each successive indexing stroke be equal in the amount of rotation to a previous or a successive indexing stroke.

In accordance with the present invention, precision alignment of the indexing table on a selected slot radial "R" is achieved by first arresting the rotational motion of the rotating index wheel 64. This action is initiated by engagement of a stop screw 72 on the wheel 64 against a surface 74a of a stop cam lever 74. Stop screw engagement is eventually followed by the locking insertion of a frustoconically tapered shot pin 76 into the index slot 64a immediately adjacent the particular stop screw 72 which engaged the stop cam lever 74. The stop cam lever 74 includes a body portion 74b having an aperture therein for receiving a supporting pin 78 which extends in a direction generally parallel and outwardly of a line tangent to the periphery of the index wheel as best shown in FIG. 2. One face 74a of the stop cam lever is generally perpendicular or normal to the longitudinal axis of the support pin 78 and is adapted to be engaged by the head of successive stop screws 72 on the index wheel 64 as the wheel is rotated in a clockwise direction as shown in FIG. 2 by the arrow A. When the head portions of the stop screws 72 begin to flatten out from wear after many repetitions, the screws are easily replaced.

Initial engagement between a moving stop screw and the awaiting surface 74a on the stop cam lever 74 results in bodily movement of the stop cam lever longitudinally on the support pin 78 because of the rotational momentum of the wheel, the shaft, the table and the workpiece thereon. This movement is in a linear direction as indicated by the arrow C (FIG. 2) along the pin. The momentum is arrested by a shock absorber 80 and the rotating wheel is brought to a stop at a point wherein the adjacent index slot 64a is positioned roughly in front of the tapered shot pin 76. The shot pin 76 is moved radially inwardly into the adjacent index slot 64a and the interaction between the tapered or wedge shaped pin and the tapered sides 66 of the particular index slot precisely centers the wheel 64 and the table 40 in the desired selected angular indexing position on a selected radial "R".

After movement of the stop lever commences in the direction of the arrow C, and the surface 74c on the stop cam lever moves into engagement with a pin 80a of the shock absorber assembly 80. The shock absorber has a body which is threadedly received and secured in a large opening or slot 18a provided in a thickened segment of the side wall 18 spaced opposite the rack piston cylinder 48. As the momentum imparted to the index wheel, shaft, table and workpiece by the rack piston 46 during an indexing rotational stroke is absorbed by the shock absorber 80, the pin 80a is depressed inwardly into the body arresting the rotary motion of the index wheel 64. This action compresses a spring in the shock absorber assembly, and when the spring is subsequently released, the stop cam lever 74 is moved back towards the opposite end of the support pin 78 as indicated by the arrow D in FIG. 4. The stop pin engaging surface 74a is also returned to a stopping position ready for enagement by the next successive stop pin 72 on the index wheel.

Before the rotational momentum of the index wheel 64 and interconnected elements is arrested to a complete stop, the end surface 74c of the stop cam lever also moves into engagement against an operator pin 82a of an electrical switch 82. This engagement causes a three-way, solenoid controlled air valve 84 (FIGS. 2 and 7) to return to an alternate exhaust position wherein a spent charge of compressed air from the index table 10 is directed out to an exhaust port 86 from a conduit 88 connected between the body of the three-way air valve and the table . The air valve is solenoid operated and when the solenoid coil 84a is again energized, the valve moves to a supply position wherein compressed air from an external source 90 is directed from the valve into the conduit 88.

In accordance with the present invention, the index table 10 includes a pneumatic control system generally indicated by the reference numeral 92 (FIGS. 2 and 7) having a base or block 94 removably mounted in the relatively large rectangular shaped bore or opening 24a formed in the end wall 24 of the main base 14. The tapered shot pin 76 is formed at the outer end of an elongated shot pin piston rod 96 which is mounted for longitudinal reciprocal movement in a rod bore segment 98 formed in the block 94 in coaxial alignment with a larger diameter shot pin piston bore or cylinder 100 as best shown in FIG. 2. The shot pin rod 96 is provided with an annular groove 96a adjacent the wedge shaped shot pin 76 and the stop cam lever 74 includes an elongated rib 74d slidably disposed in the groove. This engagement is effective to pivot the stop cam lever 74 about the supporting pin 78 between a stop position shown in FIG. 6 wherein the surface 74a is positioned in alignment for stopping engagement against a cap screw 72 on the rotating index wheel 64 and a release position (FIG. 5) wherein the surface 74a is moved above the level of the cap screw 72 thus permitting free rotation of the index wheel 64 underneath an edge of the stop cam lever.

Figure 5:
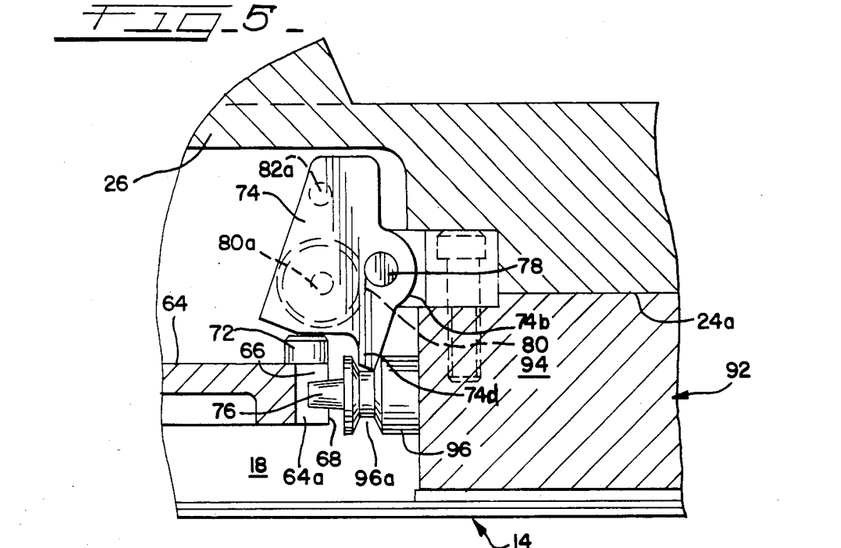
FIG. 5 is a fragmentary elevational view, with portions in cross-section, illustrating a stop cam lever in accordance with the present invention in one of its operative positions.
Figure 6:
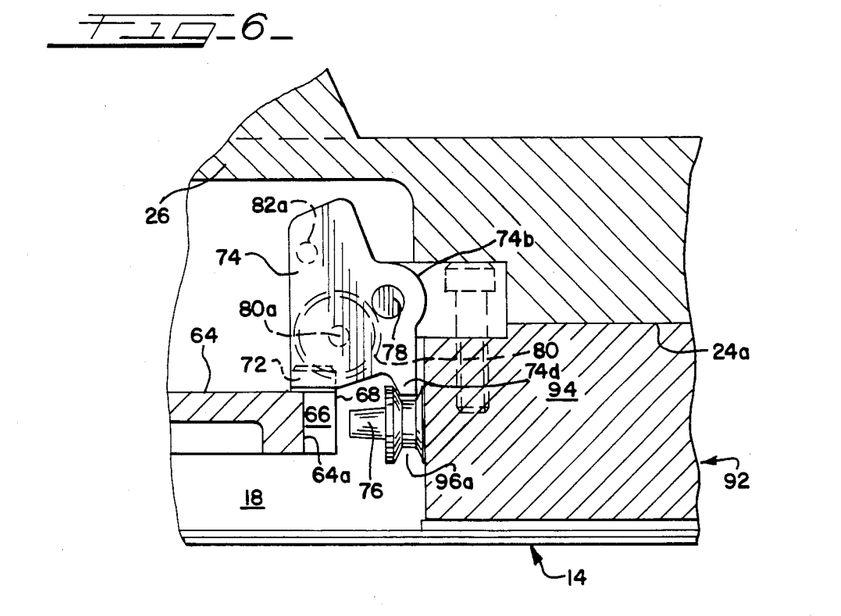
FIG. 6 is a fragmentary elevational view similar to FIG. 5 illustrating the stop cam lever in an alternate operative position.

When the shot pin rod 96 is retracted radially outwards into the piston rod bore 98 of the base, the stop cam lever 74 is pivoted in a counter-clockwise direction from the position of FIG. 5 to the position of FIG. 6, and when the shot pin rod 96 is moved radially inwardly to lock the shot pin 76 in a selected index slot 64a, the cam stop lever 74 is pivoted in a clockwise direction from the position of FIG. 6 to the position of FIG. 5. It will thus be seen that outward radial movement of the shot pin rod 96 toward the wheel 64 causes the shot pin 76 to engage a pair of tapered side surfaces 66 in the awaiting index slot 64a and the wheel may be rotated as needed by this engagement to precisely position and center the wheel on a particular radial "R" as selected. When the shot pin is in the wheel locking position as shown in FIGS. 2 and 5, the index wheel 64 and thus the workpiece supporting table 40 is positively and precisely held in position on a selected indexing radial "R".

As the shot pin 76 is moved toward the lock position, the enagement of the rib 74d in the groove 96a, causes position the stop cam lever 74 to pivot from the stop position towards a release position so that the compressed spring in the shock absorber 80 can now become effective to reposition the stop cam lever 74 along the supporting pin 78 by movement of the lever in the direction of the arrow D (FIG. 4) as soon as the lower edge of the stop cam lever is raised enough to clear the head of the adjacent stop screw 72. Subsequently, retraction of the shot pin from locked engagement in the adjacent index slot 64a causes the the stop cam lever 74 to pivot from the release position to the stop position and resets the lever in readiness for engagement with a stop screw on the next advancing indexing action of the index wheel 64. When such engagement does occur, the stop cam lever 74 is again moved by momentum along the support pin 78 in the direction of the arrow C until the surface 74c engages the pin 80a of the shock absorber 80 and the rotational motion of the index wheel 64 is arrested by the shock absorber.

The shot pin rod 96 is connected to a shot pin piston 102 adjacent an opposite end, and the piston is slideably disposed in a cylinder bore 100 which is closed at the outer end by a plug 104. The shot pin 76 is normally spring biased towards a locking or wheel engaging position by a coil spring 106 disposed in the cylinder 100 between the shot pin piston 102 and the end plug 104. The return spring 106 is effective to move the shot pin 76 to the lock position any time that air pressure is relieved from the inner annular face of the shot pin piston 102 around the rod 96.

In accordance with the present invention, the supply conduit 88 is in communication with the interior end of the shot pin cylinder 100 through a pair of passages 108 and 110 in the block 94. When pressurized air is supplied to the conduit 88 by energizing the solenoid coil 84a, the valve 84 is moved to a position wherein compressed air flows into the shot pin cylinder bore 100 and acts on the piston 102 against the spring 106 to move the shot pin 76 out of locking engagement with the adjacent slot 64a of the index wheel 64 so that the wheel may be advanced on the next rotational index stroke. As air enters the cylinder 100, the return spring 106 is compressed and the air pressure acting on the annular surface of the inner end of the piston 102 is sufficient to hold the spring in compressed condition to maintain the shot pin 76 in a retracted position outwardly of the index slots 64a on the wheel.

When the shot pin is retracted, the passage 108 in the block 94 is in communication with a first check valve 112 on an opposite side of the bore 98 via an annular groove 96b in the shot pin rod 96 and the pressurized air is effective to open the check valve and flow into a passage 114. The passage 114 is in communication with a cross passage 116 having an outer end in communication with a connector 118 and supply line 120 leading to the elbow 57 for supplying pressurized air to activate the rack piston 46 on a wheel advancing stroke as previously described. The passages 108 and 116 include short portions on opposite sides of the shot pin rod bore 98 and the valve groove 96b on the shot pin rod moves alternately into direct alignment between opposite portions of these passages as the cylinder 100 is pressurized and exhausted, respectively.

As illustrated in FIG. 2, when the shot pin 76 is in the locking position engaging a slot 64a on the index wheel 64, the valve groove 96b is in alignment between opposite segments of the passage 116 and in this position, any compressed air present the rack piston cylinder 48 is exhausted until the shot pin is next retracted to the release position (FIG. 6). When this occurs, the groove 96b moves into an alternate position between opposite segments of the passage 108 to pressure the cylinder 48 so that the rack piston 46 is actuated to move on another advancing stroke.

The cross passage 116 is in communication with a second check valve 122 on an opposite side of the shot pin rod bore 98 from the passage 114 and the second check valve is in communication with a second passage 124 parallel of the bore 98 and connected to the supply passage 108. When pressurized fluid is initially supplied to the conduit 88, the second check valve 122 remains closed and thus initially, the pressurized fluid can flow only into the bore 100 to act against the inner end surface of the piston 102. As this occurs the piston moves to compress the spring 106 and retract the shot pin 76 from the index slot 64a of the index wheel 64. When shot pin retraction has been completed, the valve groove 96b is aligned between opposite segments of the supply passage 108 on opposite sides of the bore 98 to open the check valve 112 and supply pressurized fluid to operate the rack piston 46. When the rack piston cylnder 48 is thus pressurized, the rack piston moves on an advancing stroke as indicated by the arrow B, causing the gear 44 and the table support shaft 30 to begin rotation on an indexing stroke in the direction of the arrow A. Such rotation continues until the next stop screw 72 on the index table 64 encounters the stop surface 74a of the stop cam lever 74 which is awaiting contact in a stop position as shown in FIG. 6.

Figure 7:
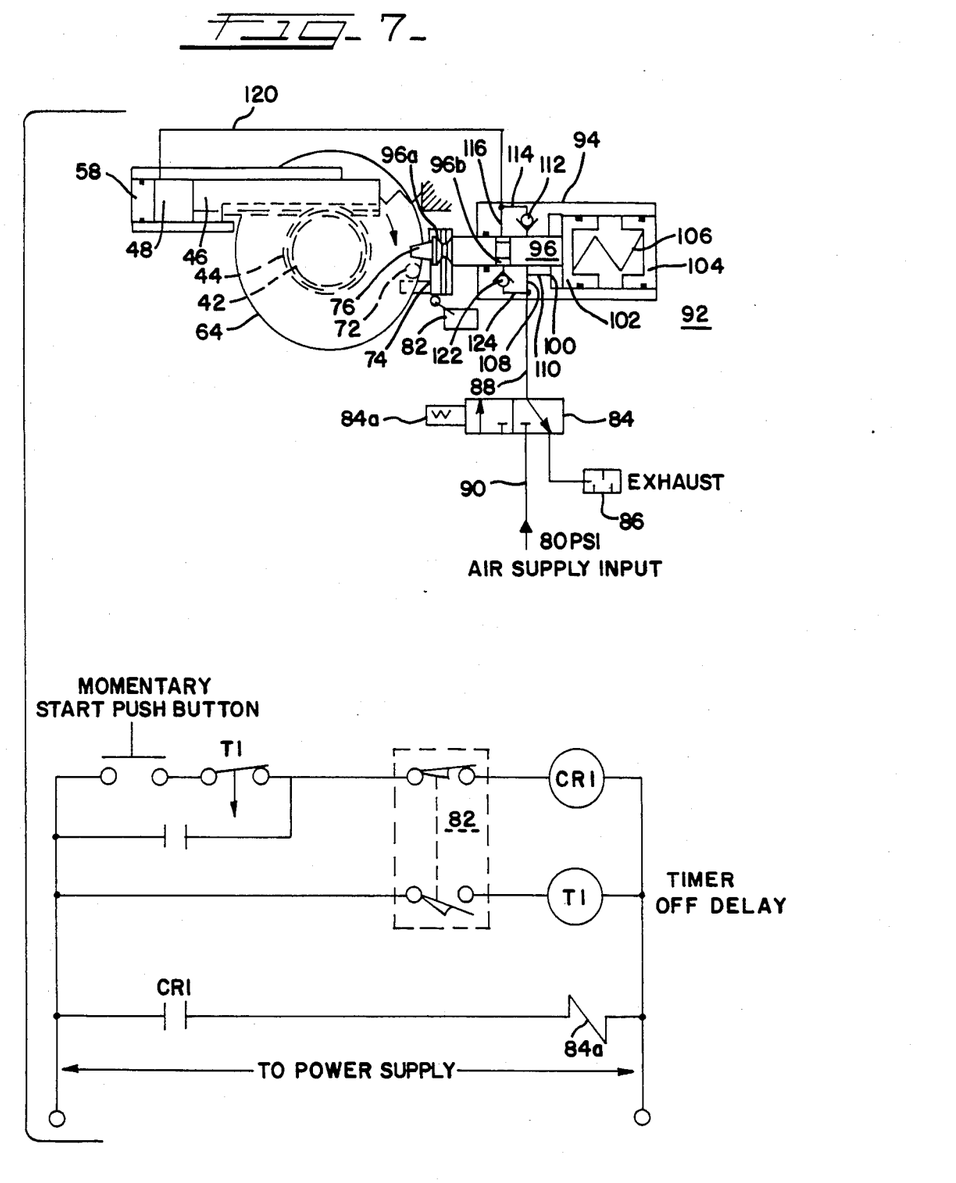
FIG. 7 is an electro-pneumatic, schematic diagram of a control system for operating and controlling the indexing table of the present invention.

As contact occurs, the stop cam lever is moved along the pin 78 in the direction of the arrow C until the pin 80a of the shock absorber 80 is engaged and the motion of the table is arrested as the shock absorber reacts to absorb the cumulative momentum energy from the rack piston, the workpiece, the table, the shaft and the index wheel. By the time that the rotational movement of the wheel has been completely arrested, the operator pin 82a of the control switch 82 has been activated and this causes the solenoid coil 84a to be deenergized so that the valve 84 returns to the exhaust position as shown in FIGS. 2 and 7 wherein the conduit 88 is connected to the exhaust port 86. As the cylinder 48 is exhausted, the spring 50 acting on the rack piston 46 begins to move the piston on a return stroke in a direction oposite to the arrow B and the air within the cylinder bore 48 is forced outwardly through the elbow 57, the supply line 120, and the fitting 118 into the cross passage 116. The air flows through the cross passage 116 via the groove 96b in the shot pin rod 96 and opens the check valve 122 to flow along the passage 124 and back out through the inlet passage 108, conduit 88 and eventually out to the exhaust port 86 through the valve 84.

Figure 4:
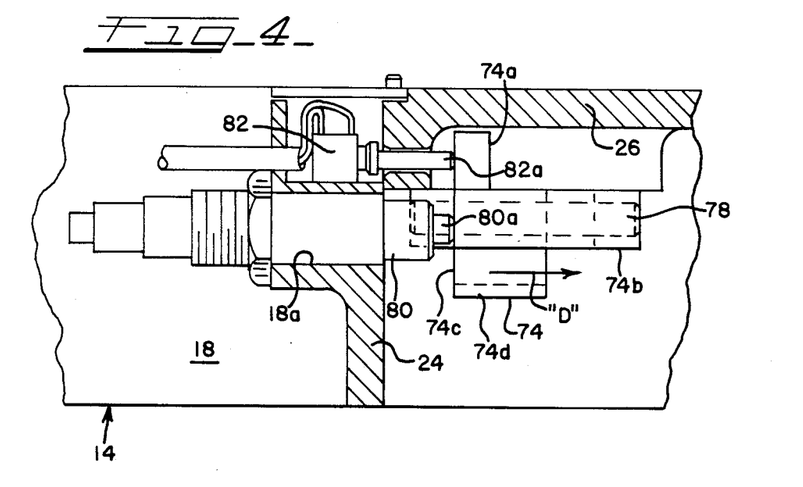
FIG. 4 is a fragmentary elevational cross-sectional view taken substantially along lines 4—4 of FIG. 2.

When the air pressure within the rack piston bore 48 approaches atmospheric, the pressure within the shot pin cylinder 100 is also near atmospheric and the spring 106 is then effective to move the shot pin 76 into the locking position to precisely align the index wheel as the shot pin is seated the adjacent index slot 64a to hold the wheel firmly in a selected index position. As the shot pin moves into the locking position, the stop cam lever 74 is pivoted from the stop position (FIG. 6) in a clockwise direction about the pin 78 to the release position (FIG. 5) and when this occurs the compressed shock absorber spring acts to slide the stop cam lever along the pin 78 in the direction of arrow D (FIG. 4). The stop action lever then remains in readiness for the next retraction of the shot pin 76 to occur and this action pivots the stop cam lever 74 in a counterclockwise direction into the stop position of FIG. 6 ready and awaiting engagement by the next advancing stop pin 72 on the rotating index table.

It will thus be seen that the indexing table 10 provides a relatively inexpensive device capable of precision accuracy in indexing a workpiece. The tapered shot pin 76 and tapered index slots 64a provide both precision centering and locking or holding of the index wheel 64 in a selected position. The rotative indexing action of the wheel is arrested by a shock absorber in order to reduce wear and tear on other components and precision accuracy is maintained over many repetitions. The amount of incremental rotational advance for successive indexing steps of the table is adjustably programmable in multiples of a minimum angular increment, which minimum is dependent on the total number of index slots provided in the wheel. Successive indexing rotational strokes do not have to be the same and a wide variety of programming can be achieved by selectively positioning the stop screws 72 only in partially selected slots or bores 70 on the wheel 64 to achieve a desired angular degree of indexing rotation between successive stop positions.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. An indexing table comprising:
a stationary base;
a workpiece supporting table having a support shaft journalled for rotation relaitve to said base;
drive means for rotating said table in one direction about a central longitudinal axis of said support shaft;
an indexing wheel on said shaft having a plurality of index slots at angularly spaced apart intervals around said axis for securing said table in a rotational position corresponding to a selected one of said slots;
shot pin means movable between a locking position for engaging a selected slot in said wheel to hold said table in said selected rotational position, and a retracted position permitting successive indexing rotation of said table;
stop means for arresting the indexing rotation of said table as successive selected slots of said wheel approach said shot pin means for permitting said shot pin means to move into said locking position,
said stop means including at least one stop member adapted to be attached to said indexing wheel at a selected position thereon in predetermined relation to a corresponding selected one of said slots, a stop cam lever supported independently of said index wheel and movable relative thereto between a stop position for stopping engagement against said stop member attached on said wheel for arresting the rotation of said wheel at a selected rotational position and a released position spaced out of the path of said stop member attached on said wheel for permitting said wheel to rotate, and resilient shock absorber means activated for arresting the rotation of said wheel after the engagement of said stop member attached on said wheel against said stop cam lever.

2. The indexing table of claim 1 wherein:
said index slots are formed in a peripheral edge of said index wheel opening outwardly to receive said shot pin means, and
wherein said shot pin means is mounted adjacent said peripheral edge of said wheel for radial reciprocal movement relative thereto between said locking position extending radially inwardly into a selected index slot and said retracted position spaced radially outwardly of said peripheral edge of said wheel.

3. The indexing table of claim 2 wherein:
each of said index slots includes a plurality of opposing wedge surfaces diverging away from one another at increasing radial distances toward said peripheral edge, and
wherein said shot pin means includes a pair of opposing wedge surfaces adapted to engage said wedge surfaces of said index slots to precisely center said index wheel on a selected indexing radial.

4. The indexing table of claim 1 including:
connector means for interconnecting said shot pin means and said stop cam lever for moving said stop cam lever toward said stop position when said shot pin means moves toward said retracted position.

5. The indexing table of claim 4, wherein:
said connector means is interconnected for moving said stop cam lever toward said release position when said shot pin means moves toward said locking position engaging a selected index a slot in said index wheel.

6. The indexing table of claim 5, wherein:

said stop cam lever is mounted for movement between first and second positions by engagement from a stop member attached on said index wheel when said stop cam lever is in said stop position.

7. The indexing table of claim 6 wherein:

said stop cam lever is movable engagement with said shock absorber means during travel from said first position toward said second position for arresting rotation of said table.

8. The indexing table of claim 7, including:

spring means for moving said stop cam lever from said second position toward said first position after said stop cam lever is moved to said release position.

9. The indexing table of claim 8, including:

first piston means for moving said shot pin means between said locking position and said retracting position.

10. The indexing table of claim 9, including:

fluid pressure means acting on said first piston means for moving said shot pin means toward said release position.

11. The indexing table of claim 10, including:

first resilient biasing means for urging said shot pin means toward said locking position.

12. The indexing table of claim 11, wherein:

said drive means includes rack piston means for rotatively indexing said table, gear means on said shaft engaged by said rack piston means for rotating movement upon travel of said rack piston means on an advancing stroke in one direction, and clutch means between said gear means and said support shaft for driving said shaft to rotate in said one direction upon travel of said rack piston means in said one direction and permitting non-rotation of said support shaft upon travel of said rack piston means in a direction opposite said one direction permitting said table to remain locked in a selected index position when said rack piston means moves on a return stroke in said opposite direction.

* * * * *